(12) United States Patent
Emrich et al.

(10) Patent No.: US 10,919,415 B2
(45) Date of Patent: Feb. 16, 2021

(54) LONGITUDINAL ADJUSTER AND VEHICLE SEAT

(71) Applicant: ADIENT LUXEMBOURG HOLDING S.À R.L., Luxembourg (LU)

(72) Inventors: Holger Emrich, Erdesbach (DE); Michael Koenig, Rodenbach (DE); Martin Reischmann, Hoehfroeschen (DE); Frank Rheinheimer, Boechingen (DE); Ralf Velten, Heltersberg (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 135 days.

(21) Appl. No.: 16/317,307

(22) PCT Filed: Jul. 6, 2017

(86) PCT No.: PCT/EP2017/066924
§ 371 (c)(1),
(2) Date: Jan. 11, 2019

(87) PCT Pub. No.: WO2018/011053
PCT Pub. Date: Jan. 18, 2018

(65) Prior Publication Data
US 2019/0291605 A1    Sep. 26, 2019

(30) Foreign Application Priority Data

Jul. 14, 2016 (DE) .................... 10 2016 212 906.6
Dec. 21, 2016 (DE) .................... 10 2016 225 784.6

(51) Int. Cl.
*B60N 2/07* (2006.01)
*B60N 2/005* (2006.01)

(52) U.S. Cl.
CPC ............. *B60N 2/073* (2013.01); *B60N 2/005* (2013.01); *B60N 2/0705* (2013.01); *B60N 2/0715* (2013.01); *B60N 2/0732* (2013.01)

(58) Field of Classification Search
CPC ........ B60N 2/07; B60N 2/073; B60N 2/0715; B60N 2/0732; B60N 2/0705; B60N 2/43; B60N 2/005
(Continued)

(56) References Cited

U.S. PATENT DOCUMENTS 4,949,931 A * 8/1990 Fujiwara .............. B60N 2/0292
                                                    248/429
5,570,508 A * 11/1996 Ress ...................... B21C 37/16
                                                    29/527.1
(Continued)

FOREIGN PATENT DOCUMENTS

DE       102 10 555 B4    12/2005
EP       2 223 822 A1      9/2010

*Primary Examiner* — Gregory A Blankenship
(74) *Attorney, Agent, or Firm* — Marshall & Melhorn, LLC

(57) ABSTRACT

A longitudinal adjuster (10) for a vehicle seat (1) includes at least one rail pair (12), which is formed from a first seat rail (14), for connecting to a seat frame side part (6), and a second seat rail (16), for connecting to a vehicle structure, that slid relative to each other in a longitudinal direction (x) and engage each other and form an inner channel (18). A reinforcing profiled element (22; 122) is fastened to the second seat rail (16) and is arranged in the inner channel (18). The reinforcing profiled element (22; 122) has a connection section (24), which is led out of the inner channel (18) toward a rear end and is connectable to a rear end surface (8) of a seat frame side part (6). The vehicle seat with the longitudinal adjuster, has a seat frame side part (6) connected to a first seat rail (4).

16 Claims, 6 Drawing Sheets

(58) Field of Classification Search
USPC .............. 296/65.13, 65.14; 24/424, 429
See application file for complete search history.

(56) References Cited

U.S. PATENT DOCUMENTS

| | | | |
|---|---|---|---|
| 2005/0230591 A1 | 10/2005 | Smith et al. | |
| 2007/0087618 A1* | 4/2007 | Terada ................. | B60N 2/0725 439/397 |
| 2012/0299352 A1* | 11/2012 | Line .................... | B60N 2/0732 297/344.1 |
| 2014/0263920 A1* | 9/2014 | Anticuar ............. | B60N 2/0715 248/429 |
| 2015/0130251 A1* | 5/2015 | Kondo .................. | B60N 2/502 297/451.3 |
| 2016/0144746 A1* | 5/2016 | Couasnon ............ | B60N 2/0705 384/34 |
| 2017/0341531 A1* | 11/2017 | Quast ................... | B60N 2/0727 |
| 2019/0232833 A1* | 8/2019 | Emrich ................ | B60N 2/0705 |
| 2019/0291605 A1* | 9/2019 | Emrich ................ | B60N 2/005 |
| 2019/0299816 A1* | 10/2019 | Emrich ................ | B60N 2/073 |
| 2020/0094711 A1* | 3/2020 | Bourven .............. | B60N 2/0818 |
| 2020/0130538 A1* | 4/2020 | Emrich ................ | B60N 2/0705 |

* cited by examiner

LONGITUDINAL ADJUSTER AND VEHICLE SEAT

CROSS REFERENCE TO RELATED APPLICATIONS

This application is a United States National Phase Application of International Application PCT/EP2017/066924 filed Jul. 6, 2017, and claims the benefit of priority under 35 U.S.C. § 119 of German Applications 10 2016 212 906.6, filed Jul. 14, 2016 and 10 2016 225 784.6, filed Dec. 21, 2016, the entire contents of which are incorporated herein by reference.

TECHNICAL FIELD

The invention relates to a longitudinal adjuster having for a vehicle seat, in particular motor vehicle seat, having at least one rail pair which is formed from a first seat rail, in particular for connection to a seat frame side part, and from a second seat rail, in particular for connection to a vehicle structure, wherein the seat rails of the seat rail pair are displaceable relative to one another in a longitudinal direction (x) and engage one another so as to form an internal channel, wherein, in the internal channel, there is arranged a reinforcement profile which is fixed to the first seat rail.

BACKGROUND

DE 102 10 555 B4 has disclosed a generic longitudinal adjuster and a generic vehicle seat. The longitudinal adjuster comprises two seat rails which are displaceable relative to one another, specifically an upper rail and a lower rail, which engage around one another. The seat rails each comprise stop means, wherein the stop means create an additional connection between the upper rail and the lower rail in the event of a crash. Forces that arise in the event of a crash are then additionally introduced via said stop means from the upper rail and the lower rail into the vehicle structure.

Such a longitudinal adjuster, and such a vehicle seat, are known from US 2005/0230591 A1.

SUMMARY OF THE INVENTION

A problem on which the invention is based is that of improving a longitudinal adjuster of the type mentioned in the introduction, in particular of increasing the strength of the longitudinal adjuster in the event of a crash, and of providing a corresponding vehicle seat.

This problem is solved according to the invention by means of a longitudinal adjuster for a vehicle seat, in particular motor vehicle seat, having at least one rail pair which is formed from a first seat rail, in particular for connection to a seat frame side part, and from a second seat rail, in particular for connection to a vehicle structure. The seat rails of the rail pair are displaceable relative to one another in a longitudinal direction and engage around one another so as to form an internal channel. In the internal channel, there is arranged a reinforcement profile which is fixed to the first seat rail. The reinforcement profile has a connection portion which is led rearwardly out of the internal channel and which is connectable to a rear end, in particular to a rearwardly directed surface, of a seat frame side part.

By virtue of the fact that the reinforcement profile has a connection portion which is led rearwardly out of the internal channel and which is connectable to a rear end, in particular to a rearwardly directed surface, of a seat frame side part, a vertical introduction of force as a result of loading of the seat frame side part in the event of a crash can be transmitted in a particularly effective manner to the reinforcement profile, whereby a so-called bottle opener effect in the region of a screw connection of the seat frame side part to the first seat rail owing to an excessively high load is avoided. The strength of the longitudinal adjuster in the event of a crash can consequently be increased. The "rearwardly directed surface" refers in particular to a surface of the seat frame side part which has a normal running substantially parallel to the longitudinal direction. The "seat frame side part" also refers generally to a component of the seat frame, a transverse profile, a reinforcement element of the seat frame, or the like.

The connection portion may furthermore be formed integrally with the reinforcement profile. The connection portion may be bent upward through approximately 90° about a bend axis running in a transverse direction. The connection portion may project approximately perpendicularly from a main body, in particular from a rear end of the main body, of the reinforcement profile. The main body may be substantially planar. The main body may be oriented perpendicular to the vertical direction.

The reinforcement profile may preferably be manufactured from metal, in particular from a metal sheet. The reinforcement profile may, for example in the case of a vehicle seat pre-mounted on a seat rail pair, be insertable from the rear end of the rail pair into the internal channel between the first seat rail and the second seat rail. The reinforcement profile may be held by means of a fixing element in a rearwardly directed surface of the seat frame side part. The fixing element may for example be a rivet or a screw connection.

The reinforcement profile may be fixed to the first seat rail by means of a screw-nut arrangement; in particular, a nut of the screw-nut arrangement may be secured against rotation relative to the first seat rail. Furthermore, a seat frame side part may be connectable to the first seat rail by means of the screw-nut arrangement. The nut of the screw-nut arrangement may have a cross section which is laterally supported at least in sections on the first seat rail. The nut may be secured against rotation in the internal channel on the first seat rail. The nut may have a substantially rectangular cross section. The nut may have longitudinal grooves along its side surfaces. The nut may be guided, in particular by means of a lower portion, in a guide rail arranged in the internal channel on the second seat rail. The guide rail may be fixed to the second seat rail. The guide rail and the lower portion of the nut may engage around one another. The guide rail may engage laterally into longitudinal grooves of the nut.

The reinforcement profile may have a substantially L-shaped cross section as viewed in the transverse direction.

Provision may furthermore be made for the connection portion to have a projection and for the seat frame side part to have a recess, wherein, in the mounted state, the projection of the connection portion engages into the recess of the seat frame side part. A multiplicity of projections may be arranged on the connection portion of the reinforcement profile. The projections may project forwardly, parallel to the longitudinal direction, from the connection portion. The projections may be arranged pairwise, in particular so as to be bent in a forwardly pointing manner, on a left-hand side and on a right-hand side of the connection portion. The projections may be of hook-like configuration. The projections may, in the event of loading and contacting of the seat frame side part, engage behind the seat frame side part in the region of the recesses. Provision may alternatively be made for the connection portion to have a recess and for the seat frame side part to have a projection, wherein, in the mounted state, the projection of the seat frame side part engages into the recess of the connection portion of the reinforcement profile.

In the connection portion and in the rearwardly directed surface, there may be provided in each case one passage bore for the purposes of the connection by means of the fixing element. The connection portion may have in each case one recess above and below a passage bore. The seat frame side part may have a projection above and below the passage bore. In the mounted state, projections of the seat frame side part may engage into the recesses of the connection portion of the reinforcement profile.

Alternatively, the connection portion may have in each case one projection above and below the passage bore, and the seat frame side part may have a recess above and below the passage bore, wherein the projections of the connection portion of the reinforcement profile engage, in the mounted state, into the recesses of the seat frame side part.

A diameter of the passage bore in the connection portion may be slightly larger than a diameter of the passage bore in the seat frame side part. A gap may be formed between the fixing element and the connection portion. The fixing element may hold the reinforcement profile on the seat frame side part only in a longitudinal direction. perpendicular to the longitudinal direction, the mounted reinforcement profile may have a small degree of play.

The projections of the seat frame side part may be turned out of the rearwardly directed surface in a rearward direction, for example by being cut free and bent out. The projections may be stamped out of the rearwardly directed surface or welded to the rearwardly directed surface.

The projections may be capable of being placed in engagement, in the region of an upper edge, with an upper edge portion of the recesses. A force in a vertical direction can be introduced via the connection portion into the reinforcement profile and, after jamming-together of the reinforcement profile and of the anchor, can be directly introduced further via a rail-floor adapter into the vehicle structure.

An attachment of the connection portion to the rest of the body of the reinforcement profile may be realized substantially over the entire width of the reinforcement profile, in particular over the entire extent in a transverse direction, whereby a load capacity of the connection between the seat frame side part and the reinforcement profile is increased.

The object is furthermore achieved by means of a vehicle seat having a longitudinal adjuster as per the above description, wherein the vehicle seat has a seat frame side part which is connected to the first seat rail. The vehicle seat according to the invention consequently has the same advantages as the embodiments of the longitudinal adjuster described above.

Before refinements of the invention are described in more detail below on the basis of drawings, it must firstly be stated that the invention is not restricted to the described components or to the described method steps. Furthermore, the terminology used does not constitute a limitation, but is merely of an exemplary nature. Where the singular is used below in the description and in the claims, this also encompasses the plural in each case, unless the context explicitly rules this out.

The invention will be discussed in more detail below on the basis of advantageous exemplary embodiments illustrated in the figures. The invention is however not restricted to these exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
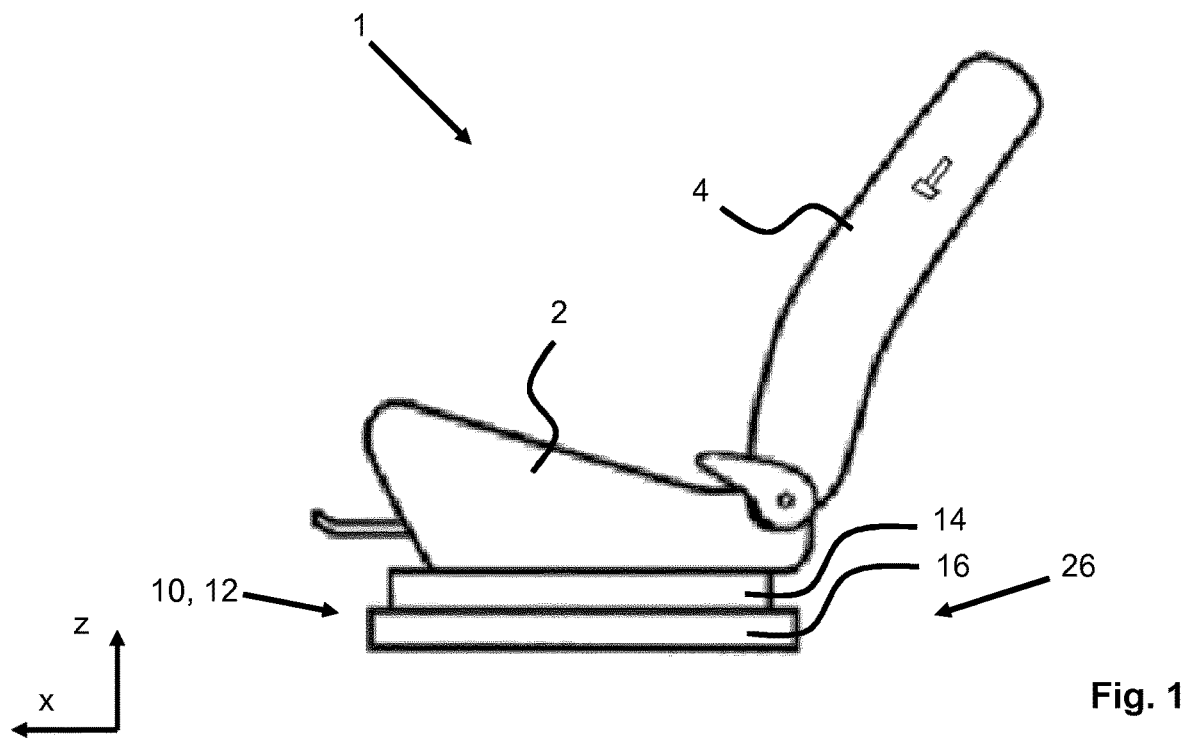
FIG. 1 is a schematic view of a vehicle seat according to the invention.

Referring to the drawings, a vehicle seat 1 schematically illustrated in FIG. 1 will be described below using three spatial directions running perpendicular to one another. In the case of a vehicle seat 1 installed in the vehicle, a longitudinal direction x runs substantially horizontally and preferably parallel to a vehicle longitudinal direction, which corresponds to the normal direction of travel of the vehicle. A transverse direction y running perpendicular to the longitudinal direction x is likewise oriented horizontally in the vehicle, and runs parallel to a vehicle transverse direction. A vertical direction z runs perpendicular to the longitudinal direction x and perpendicular to the transverse direction y. In the case of a vehicle seat 1 installed in the vehicle, the vertical direction z runs parallel to the vehicle vertical axis.

The position terms and directional terms used, such as for example front, rear, top and bottom, relate to a viewing direction of an occupant seated in the vehicle seat in a normal seating position, wherein the vehicle seat is installed in the vehicle, is in a use position suitable for conveying passengers, with an upright backrest, and is oriented in the conventional manner in the direction of travel. The vehicle seat may however also be installed in a different orientation, for example transversely with respect to the direction of travel.

The vehicle seat 1 shown in FIG. 1 for a motor vehicle has a seat part 2 and a backrest 4 which is adjustable in terms of its inclination relative to the seat part 2. An inclination of the backrest 4 may be settable for example by means of a detent fitting or a geared fitting. The vehicle seat 1 is, for adjustment of a seat longitudinal position, mounted on a longitudinal adjuster 10. The longitudinal adjuster 10 has a rail pair 12, preferably two seat rail pairs 12. Each rail pair 12 is formed from a first seat rail 14, in particular for connection to a seat frame side part 6, and a second seat rail 16, in particular for connection to a vehicle structure. The seat rails 14, 16 of the seat rail pair 12 are displaceable relative to one another in the longitudinal direction x.

Figure 2:
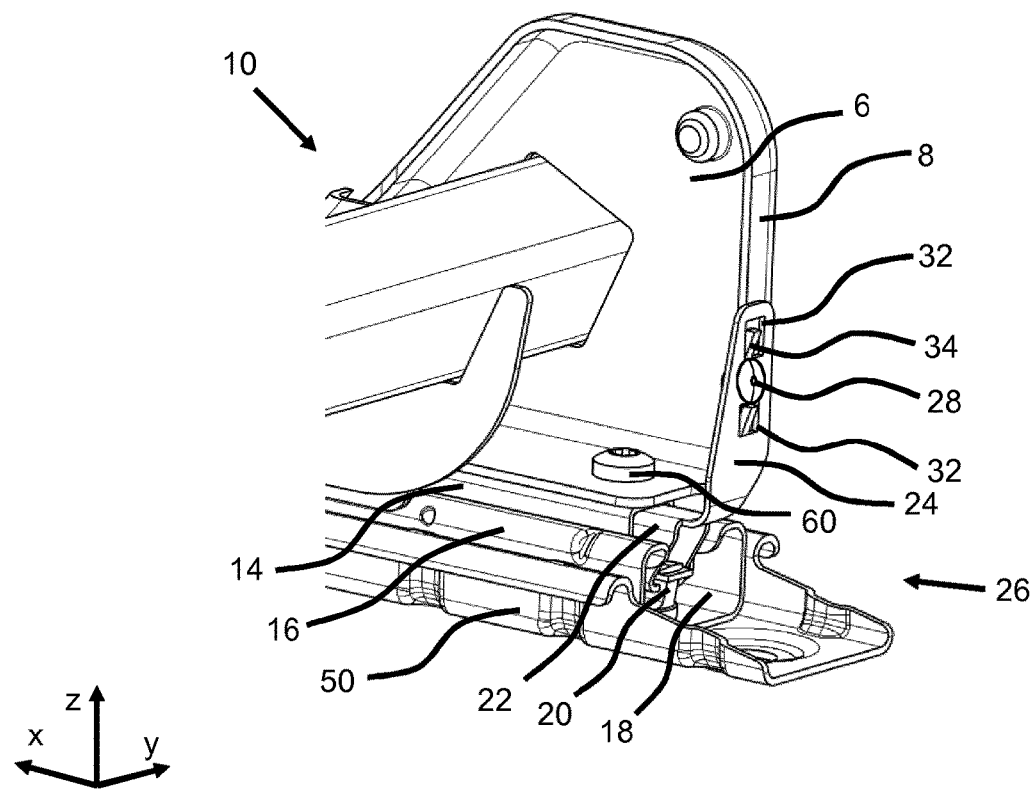
FIG. 2 is an enlarged detail perspective view of a rear end of the longitudinal adjuster as per a first exemplary embodiment.

FIG. 2 shows an enlarged detail view of a rear end 26 of the longitudinal adjuster 10. The seat rail 14, 16 of the seat rail pair 12 engage around one another so as to form an internal channel 18, wherein the first seat rail 14 serves for connection to a seat frame side part 6 and the second seat rail 16 serves for connection to a vehicle structure (not illustrated). In the internal channel 18, there is arranged an anchor 20, which is fixed to the second seat rail 16. In the internal channel 18, there is also arranged a reinforcement profile 22 which is fixed to the first seat rail 14. The reinforcement profile 22 and the anchor 20 are spaced apart from one another in the normal situation and interlock with one another in reaction to a predefined application of force, for example in the event of a crash; in particular, the reinforcement profile 22 and the anchor 20 engage into one another. The reinforcement profile 22 has a connection portion 24, which is connected to a rear end 26, in particular to a rearwardly directed surface 8, of the seat frame side part 6. In the present case, the connection portion 24 is formed integrally with the reinforcement profile 22. The connection portion 24 projects approximately perpendicularly from the rest of the main body of the reinforcement profile 22. The anchor 20 may for example be fastened to the second seat rail 16 and to a vehicle-specific seat rail adapter 50. The seat rail adapter 50 serves preferably for a fastening of the longitudinal adjuster 10 to a vehicle structure.

The reinforcement profile 22 and the anchor 20 are preferably manufactured from metal, in particular from a metal sheet. The reinforcement profile 22 may, for example in the case of a vehicle seat 1 pre-mounted on a seat rail pair 12, be inserted from the rear into the rear end 26 of the internal channel 18 between the first seat rail 14 and the second seat rail 16. The reinforcement profile 22 is held by means of a fixing element 28 in the rearwardly directed surface 8 of the seat frame side part 6. The fixing element 28 may for example be a rivet. The fixing element 28 may likewise be provided by means of a screw connection. Furthermore, a further screw connection may be arranged on the seat frame side part 6 so as to project in the vertical direction z through the first seat rail 14 and the reinforcement profile 22.

Figure 3:
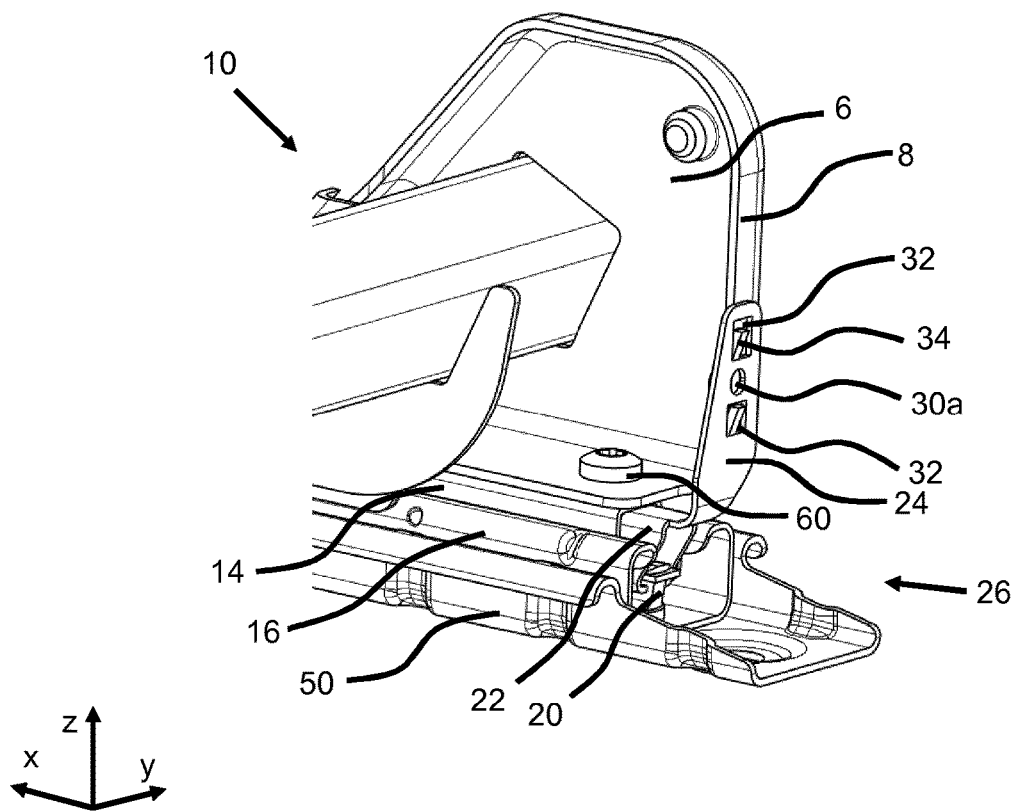
FIG. 3 is a perspective view of the rear end of the longitudinal adjuster of FIG. 2 without a fixing element.
Figure 4:
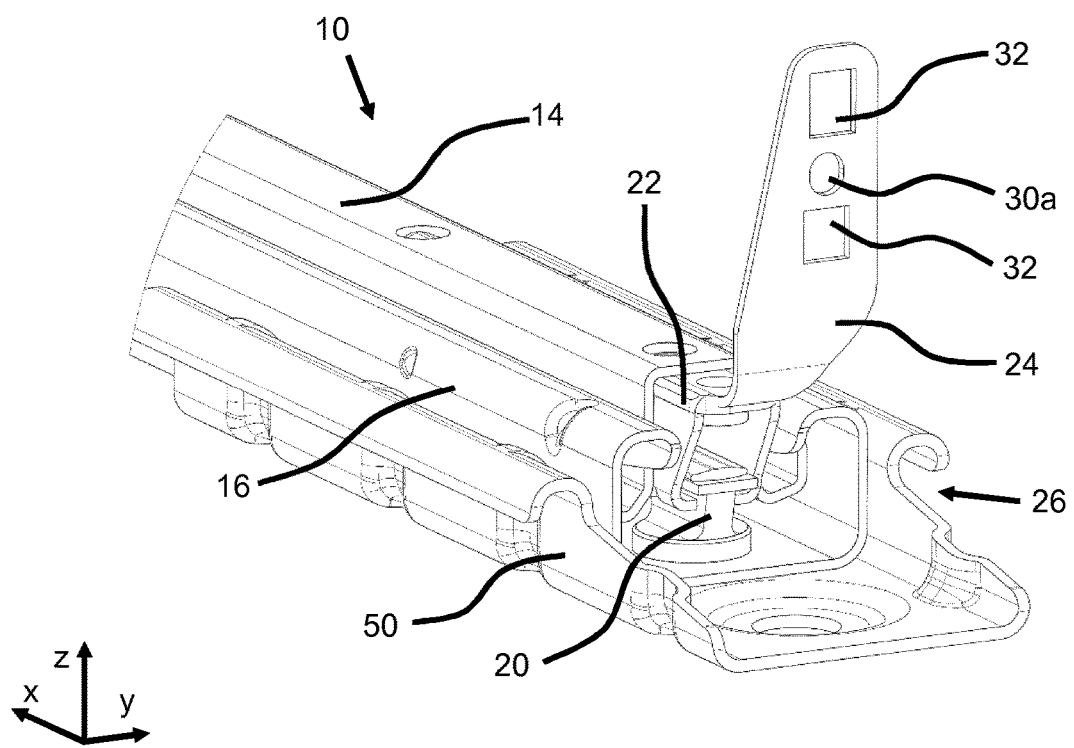
FIG. 4 is a perspective view of the rear end of the longitudinal adjuster from FIG. 2 without a seat frame side part.
Figure 5:
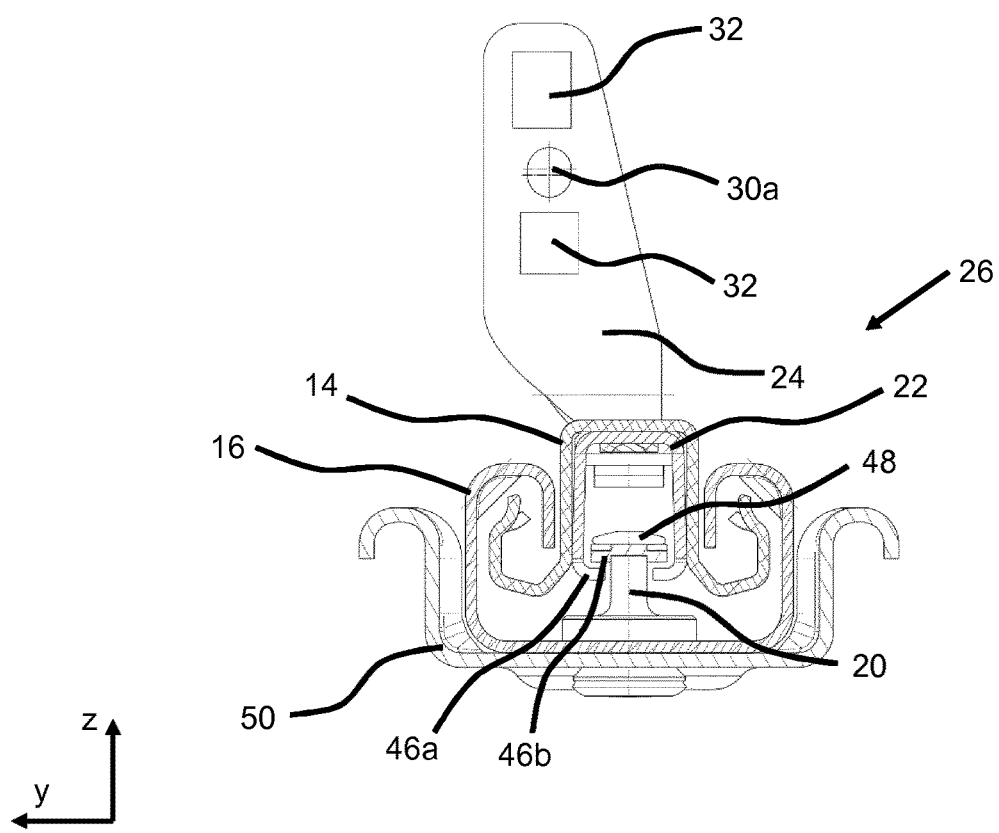
FIG. 5 is a cross sectional view of the longitudinal adjuster of FIG. 4.
Figure 6:
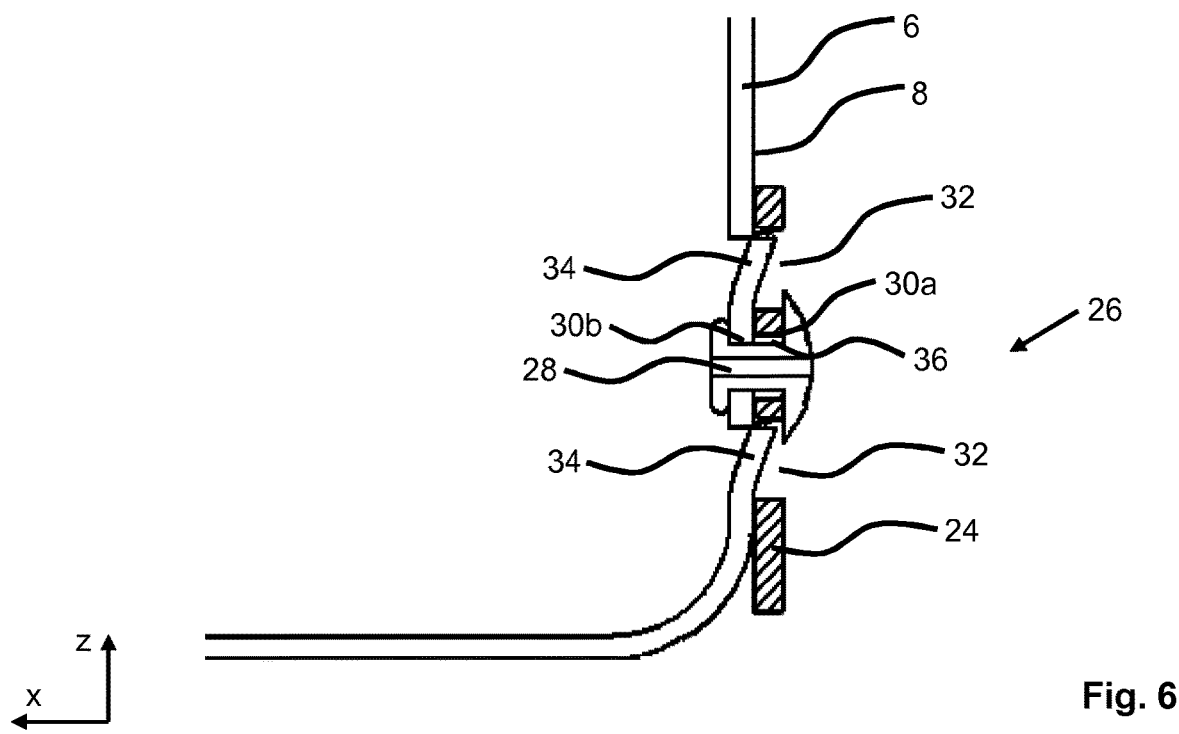
FIG. 6 is a detail sectional view, perpendicular to a transverse direction, through the longitudinal adjuster of FIG. 2.

FIG. 3 illustrates the longitudinal adjuster 10 as per FIG. 2 without the fixing element 28, and FIG. 4 illustrates said longitudinal adjuster without the seat frame side part 6. FIG. 5 and FIG. 6 show an illustration of a cross section of the longitudinal adjuster 10 of FIG. 4. It is shown here that in each case one passage bore 30a, 30b, which passage bores are aligned with one another, is provided in the connection portion 24 and in the rearwardly directed surface 8 for the purposes of the connection by means of the fixing element 28. The connection portion 24 has in each case one recess 32 above and below the passage bore 30a. The main body of the reinforcement profile 22 has a substantially C-shaped cross-sectional profile.

FIG. 6 is a detail sectional illustration, perpendicular to a transverse direction y, through the longitudinal adjuster 10 of FIG. 4. The seat frame side part 6 has a projection 34 above and below the passage bore 30b. In the mounted state, the projections 34 of the seat frame side part 6 engage into the recesses 32 of the connection portion 24 of the reinforcement profile 22. It can also be seen that the diameter of the passage bore 30a in the connection portion 24 is slightly larger than the diameter of the passage bore 30b in the seat frame side part 6. This leads to a gap 36 between the fixing element 28 and the connection portion 24. The fixing element 28 holds the reinforcement profile 22 on the seat frame side part 6 only in the longitudinal direction x. Perpendicular to the longitudinal direction x, the mounted reinforcement profile 22 has a small degree of play.

The projections 34 of the seat frame side part 6 are in the present case turned out of the rearwardly directed surface 8 in a rearward direction, for example by being cut free and bent out. It is likewise also possible for the projections 34 to be stamped out or to be welded to the rearwardly directed surface 8.

In the event of the backrest 4 of the vehicle seat 1 being subjected to an excessive force from the rear, such as may be caused for example by an unsecured cargo striking the backrest 4 in the event of a crash, the rear end 26 of the vehicle seat 1 and the seat frame side part 6 are caused to lift upward in the vertical direction z. In the event of this improper loading of the vehicle seat 1, an upper edge of the projections 34 engages in each case with an upper edge portion of the recesses 32. Provision is made here whereby forces in the vertical direction z can be introduced via the connection portion 24 into the reinforcement profile 22 and, after jamming-together of the reinforcement profile 22 and of the anchor 20, can be directly transmitted onward via the anchor 20 into the vehicle structure. Improper loading, in particular an excessively intense loading, of the first and second seat rails 14, 16 in the vertical direction z is avoided, whereby, furthermore, an overload-induced deformation of the seat rails 14, 16, to the point of so-called separation, is prevented.

The attachment of the connection portion 24 to the rest of the body of the reinforcement profile 22 is preferably realized substantially over the entire width of the reinforcement profile 22, in the present case the entire extent in a transverse direction y, whereby a load capacity of the connection between the seat frame side part 6 and the reinforcement profile 22 is increased. Furthermore, the force to be dissipated can, relative to a transverse direction y, be introduced symmetrically into a left-hand part and a right-hand part, as viewed in the longitudinal direction y, of the reinforcement profile 22.

Figure 7:
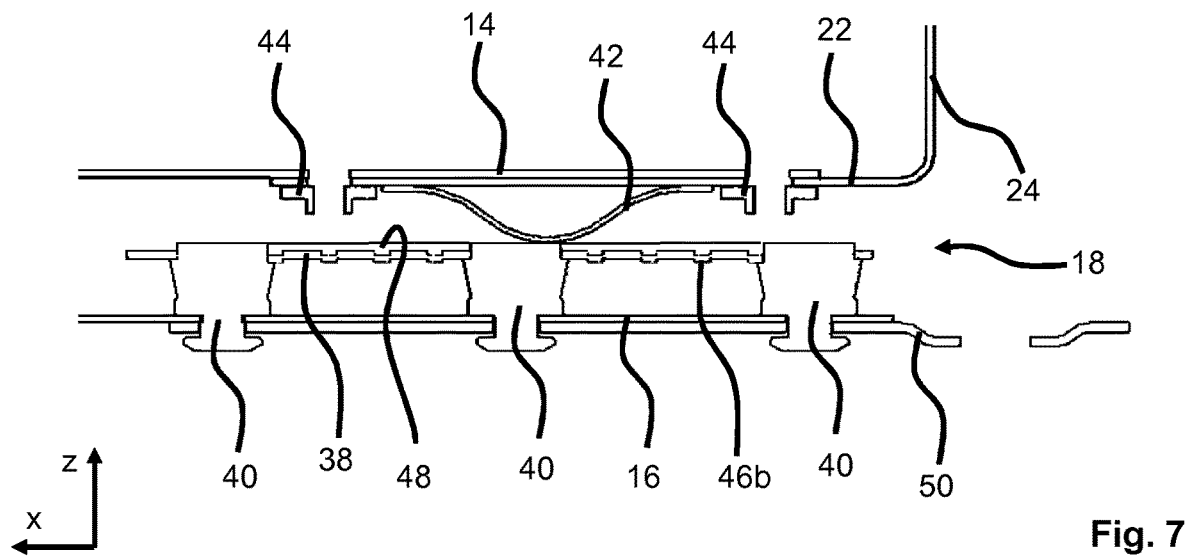
FIG. 7 is a longitudinal sectional view through the longitudinal adjuster of FIG. 4.

FIG. 7 is an illustration of a longitudinal section, perpendicular to the transverse direction y, through the longitudinal adjuster 10 of FIG. 4. In the interior of the main body of the reinforcement profile 22, there are arranged two holding elements 44, which serve for the fixing of the reinforcement profile 22 to the upper rail. A spring element 42 is held and/or braced between the two holding elements 44. The spring element 42 may preferably be configured as a leaf spring. The reinforcement profile 22 has a toothing 46a in a lower region, in particular in the region of the two end edges of the C-shaped cross-sectional profile.

The anchor 20 has an anchor plate 38, which is held on the second seat rail 16 by means of three anchor bolts 40. The anchor bolts 40 hold the anchor plate 38 with a defined spacing to a floor portion of the second seat rail 16 in the vertical direction z. By means of those ends of the anchor bolts 40 which are situated opposite the anchor plate 38 in each case, the anchor 20 is held in the second seat rail 16 and in the seat rail adapter 50. Furthermore, the anchor plate 38 has a downwardly directed counterpart toothing 46*b*, which can be placed in engagement with the toothing 46*a* of the reinforcement profile 22 when the reinforcement profile 22 is pulled upward owing to a corresponding improper loading of the vehicle seat 1. The engagement of the toothing 46*a* and of the counterpart toothing 46*b* now additionally secures the vehicle seat in the longitudinal direction x against an undesired longitudinal displacement in the event of the improper loading of the vehicle seat 1.

On the anchor plate 38, there is furthermore preferably arranged a buffer 48 which serves for the provision and/or adaptation of a unitary, uniform surface of the anchor plate 38 and of the anchor bolts 40. The spring element 42 of the reinforcement profile 22 is supported on said surface, whereby an undesired rattling noise can be avoided. A spring force of the spring element 42 is dimensioned such that a free play of the rail pair 12 is reduced in order to avoid rattling noises, without this resulting in an engagement of the toothing 46*a* of the reinforcement profile 22 and of the counterpart toothing 46*b* of the anchor plate 38.

Figure 8:
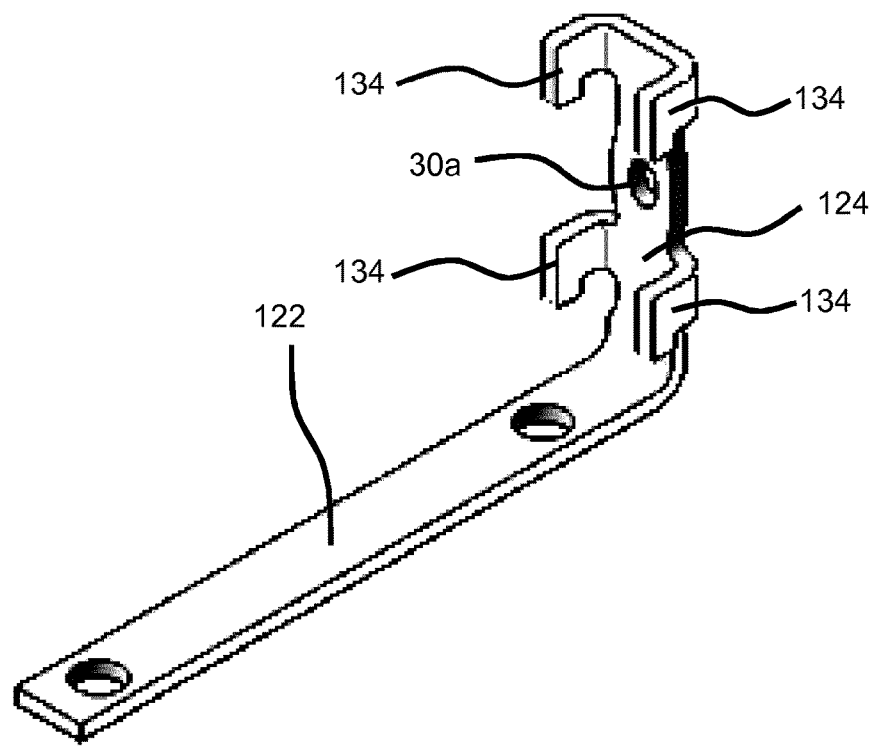
FIG. 8 is a perspective view of a reinforcement profile of a second exemplary embodiment of the longitudinal adjuster.

FIG. 8 shows a reinforcement profile 122 of the longitudinal adjuster 10 in a further embodiment. Unless explicitly described otherwise, the second exemplary embodiment of the reinforcement profile 122 below corresponds to the above-described reinforcement profile 22. The reinforcement profile 122 has a substantially L-shaped cross section as viewed in the transverse direction y. The reinforcement profile 122 has a connection portion 124, which is connectable to a rearwardly directed surface 8 of the seat frame side part 6. In the present case, the connection portion 124 is formed integrally with the reinforcement profile 122. In the present case, the connection portion 124 is bent upwardly through approximately 90° and projects approximately perpendicularly from the rest of a main body of the reinforcement profile 122. In the present case, four projections 134 are arranged on the connection portion 124 of the reinforcement profile 122. The projections 134 project forwardly in the longitudinal direction x from the connection portion 124. The projections 134 are arranged pairwise, in particular so as to be bent in a forwardly pointing manner, in each case on a left-hand side and on a right-hand side of the connection portion 124. The projections 134 are of hook-like configuration.

Figure 9:
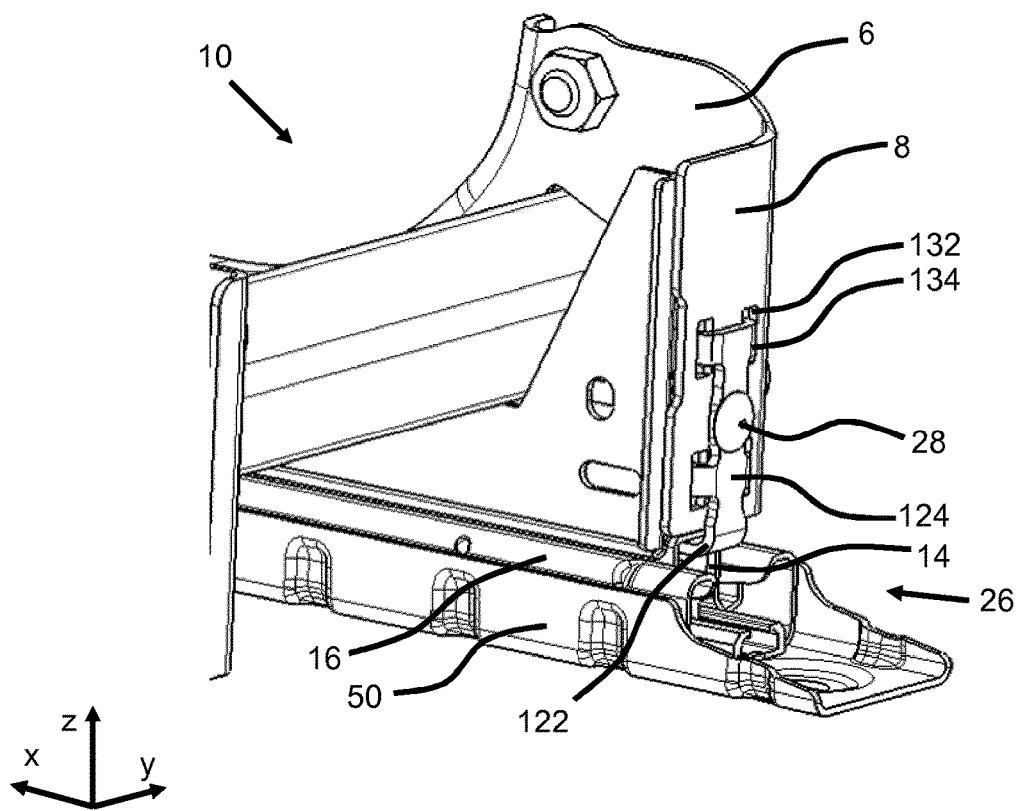
FIG. 9 is an enlarged detail perspective view of a rear end of the longitudinal adjuster with the reinforcement profile of FIG. 8.

FIG. 9 shows a rear end of the longitudinal adjuster 10 with a partially mounted reinforcement profile 122. In the present case, the seat frame side part 6 has four recesses 132. In the mounted state, the projections 134 of the connection portion 124 engage into the recesses 132 of the seat frame side part 6. In the event of loading of the seat frame side part 6, the projections 134 engage behind the seat frame side part 6 in the region of the recesses 132. In the normal situation, the projections 134 inserted into the recesses 132 are arranged spaced apart, with the formation of a gap, from at least one lower edge portion of the recesses 132. In the loading situation, in particular when the rear end 26 of the seat frame side part 6 is forced upward, at least one, but preferably all, of the projections 134 makes contact with the edge portion of the respective recess 132 and is thus in positively locking engagement such that the projections 134 are secured against emerging from the recesses 132 in the loading situation.

Figure 10:
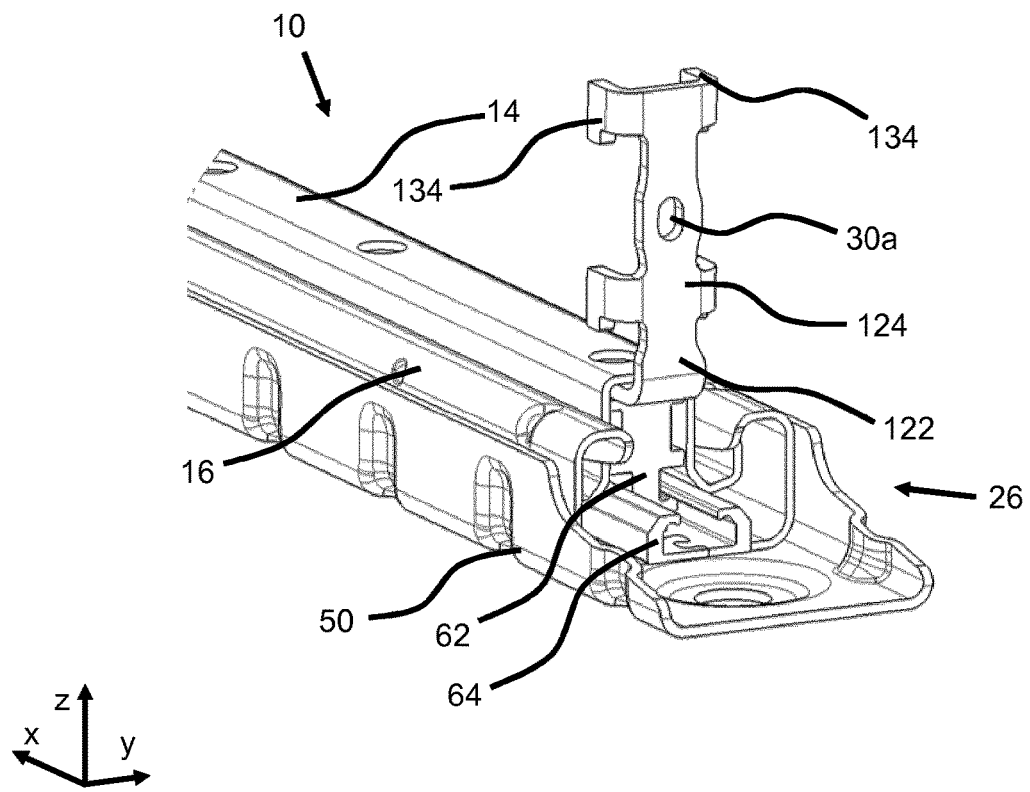
FIG. 10 is a perspective view of the longitudinal adjuster of FIG. 9 without the seat frame side part.

FIG. 10 shows an arrangement of the reinforcement profile 122 and of the rail pair 16 without the seat frame side part 6. The reinforcement profile 122 is fixable to the first seat rail 14 by means of a screw-nut arrangement. In the present case, the screw 60 is not shown in FIGS. 7 to 10 for the sake of a clearer illustration, but said screw is, after the mounting of the seat frame side part 6, arranged preferably as illustrated in FIGS. 2 and 3. A nut 62, 162 of the screw-nut arrangement has a cross section such that the nut 62, 162 is supported laterally at least in sections against the first seat rail 14. As a result of the support on the first seat rail 14, the nut 62, 162 is secured against rotation relative to the first seat rail 14.

Figure 11:
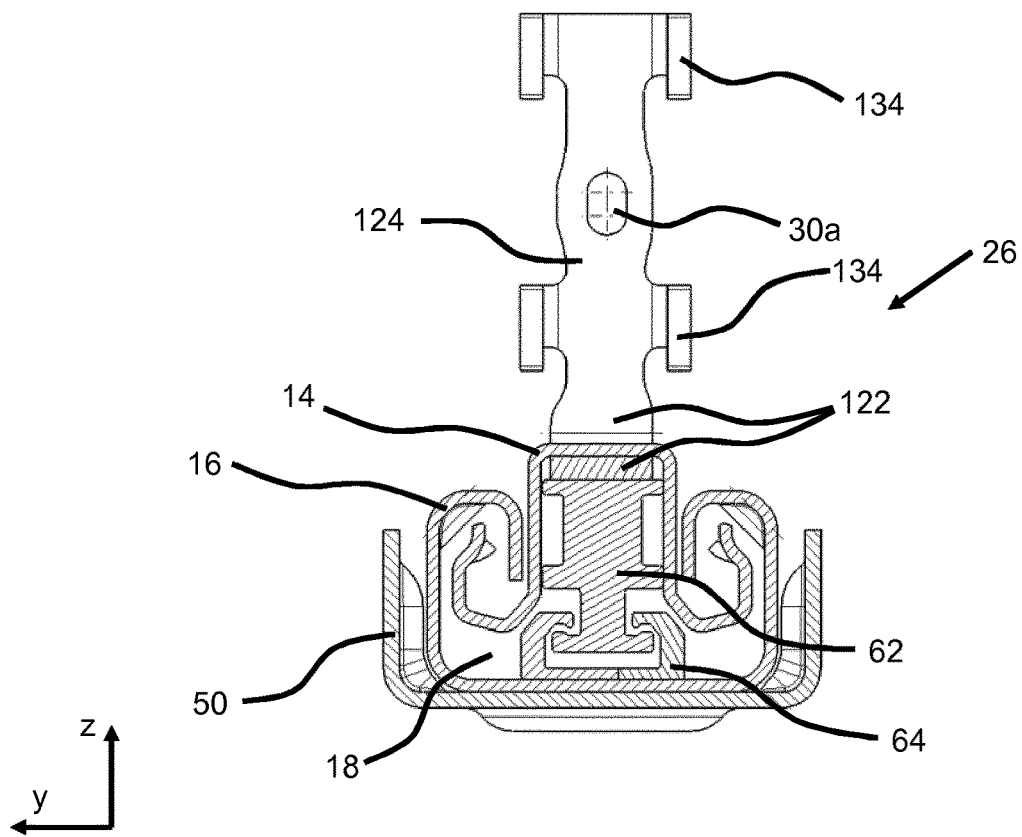
FIG. 11 is a front sectional view of the longitudinal adjuster of FIG. 10.

FIG. 11 shows a front view of the embodiment as per FIG. 9, wherein the nut 62 has a cross section with, in the present case, four laterally arranged longitudinal grooves. The nut 62 is arranged such that it can be guided with a lower portion of the cross section in a guide rail 64. The guide rail 64 is fixed to the second seat rail 16. The guide rail 64 is of c-shaped configuration in cross section and engages with its ends into two oppositely situated longitudinal grooves of the lower portion of the nut 62. Consequently, the guide rail 64 and the nut 62 engage around one another.

Figure 12:
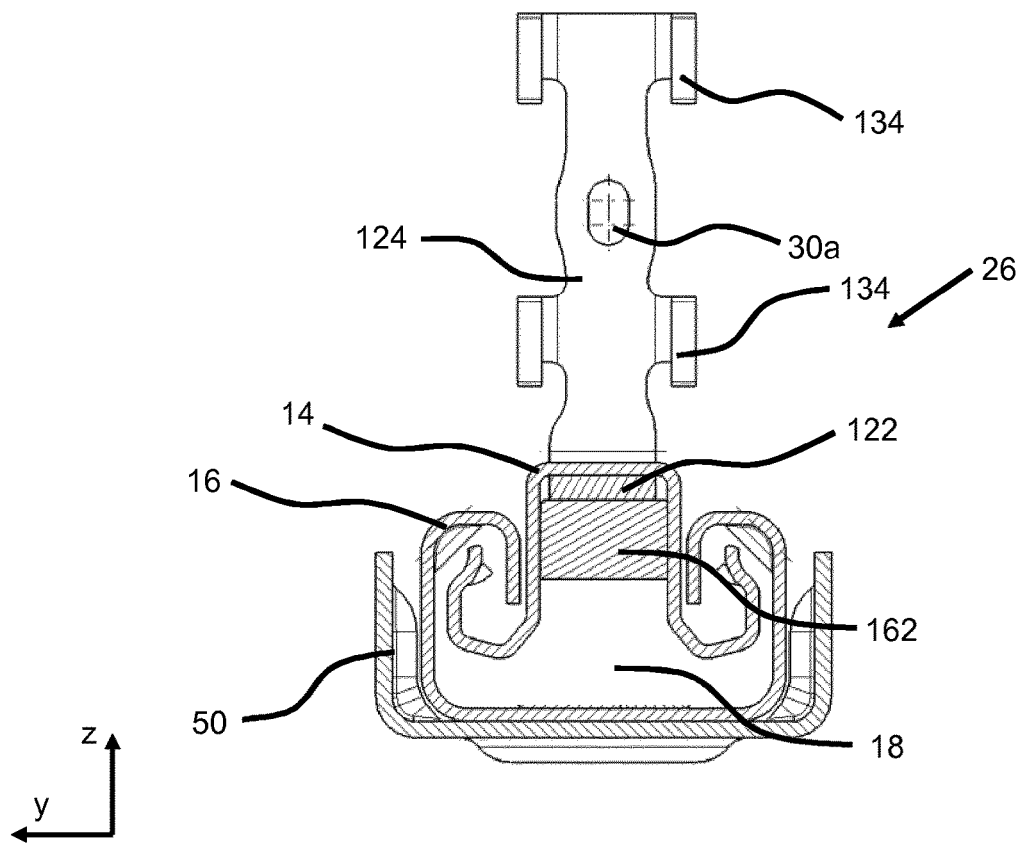
FIG. 12 is a front sectional view of a longitudinal adjuster as per a third exemplary embodiment.

FIG. 12 shows a rear view, corresponding to FIG. 11, of a nut 162 as per a further exemplary embodiment. The nut 162 has a rectangular cross section, wherein guidance of the nut 162 in a guide rail is not provided. The lateral support of the nut 162 in the first seat rail 14 furthermore serves for securing the nut 162 against rotation. Said support furthermore likewise serves for stabilizing the first seat rail 14 such that, in the event of overloading, said first seat rail cannot be deformed parallel to the transverse direction y, in particular cannot bend in the direction of the internal channel 18.

The features disclosed in the above description, in the claims and in the drawings may be of importance both individually and in combination for the realization of the invention in its various refinements.

Even though the invention has been described in detail in the drawings and in the above illustration, the illustrations are to be understood as being illustrative and exemplary, and not of a limiting nature. In particular, the selection of the proportions of the individual elements illustrated in the drawings is not to be interpreted as imperative or limiting. Furthermore, the invention is in particular not limited to the exemplary embodiments discussed. Further variants of the invention, and the design thereof, will emerge to a person skilled in the art from the above disclosure, from the figures and from the claims.

Expressions such as "comprise", "have", "include", "contain" and the like used in the claims do not rule out further elements or steps. The use of the indefinite article does not rule out a multiplicity. A single device may perform the functions of several of the units or devices mentioned in the claims.

While specific embodiments of the invention have been shown and described in detail to illustrate the application of the principles of the invention, it will be understood that the invention may be embodied otherwise without departing from such principles.

The invention claimed is:

1. A longitudinal adjuster for a vehicle seat, the longitudinal adjuster comprising:
    at least one rail pair comprising a first seat rail for connection to a seat frame side part, and a second seat rail for connection to a vehicle structure, wherein the seat rails of the seat rail pair are displaceable relative to one another in a longitudinal direction and engage around one another so as to form an internal channel;
a reinforcement profile arranged at least partially in the internal channel, the reinforcement profile being fixed to the first seat rail; and
a connection portion, wherein the reinforcement profile is connected to the connection portion, which connection portion is led rearwardly out of the internal channel and which connection portion is connectable to a rearwardly directed surface, of the seat frame side part;
wherein:
the connection portion has a projection and the seat frame side part has a recess;
the projection of the connection portion can be placed in engagement with the recess of the seat frame side part;
the connection portion has at least another projection to provide a multiplicity of projections;
the multiplicity of projections is arranged on the connection portion of the reinforcement profile;
the projections project forwardly in the longitudinal direction from the connection portion.

2. The longitudinal adjuster as claimed in claim 1, wherein the connection portion is formed integrally with the reinforcement profile.

3. The longitudinal adjuster as claimed in claim 1, wherein the connection portion is bent upward, through approximately 90°, about a bend axis running parallel to a transverse direction.

4. The longitudinal adjuster as claimed in claim 1, wherein:
the reinforcement profile comprises a main body; and
the connection portion projects approximately perpendicularly from a rear end of the main body.

5. The longitudinal adjuster as claimed in claim 1, wherein the reinforcement profile is manufactured from a metal sheet.

6. The longitudinal adjuster as claimed in claim 1, further comprising a screw-nut arrangement, wherein the reinforcement profile is fixed to the first seat rail by means of the screw-nut arrangement.

7. The longitudinal adjuster as claimed in claim 6, wherein a nut of the screw-nut arrangement is secured against rotation relative to the first seat rail.

8. The longitudinal adjuster as claimed in claim 7, wherein a nut of the screw-nut arrangement is guided in a guide rail arranged in the internal channel on the second seat rail.

9. The longitudinal adjuster as claimed in claim 1, further comprising a fixing element, wherein the reinforcement profile is held by means of the fixing element on said rearwardly directed surface of the seat frame side part.

10. The longitudinal adjuster as claimed in claim 1, wherein the projections are arranged pairwise, in particular so as to be oriented forwardly pointing on a left-hand side and on a right-hand side of the connection portion.

11. The longitudinal adjuster as claimed in claim 9, wherein:
a passage bore is provided in the connection portion; and
a passage bore is provided in the rearwardly directed surface for the purposes of the connection by means of the fixing element.

12. A vehicle seat comprising:
a seat frame side part; and
a longitudinal adjuster comprising:
at least one rail pair comprising a first seat rail connected to the seat frame side part and a second seat rail for connection to a vehicle structure, wherein the seat rails of the seat rail pair are displaceable relative to one another in a longitudinal direction and engage one another so as to form an internal channel;
a reinforcement profile arranged at least partially in the internal channel, the reinforcement profile being fixed to the first seat rail; and
a connection portion, wherein the reinforcement profile is connected to the connection portion, which connection portion is led rearwardly out of the internal channel and which connection portion is connected to a rearwardly directed surface of the seat frame side part;
wherein:
the connection portion has a projection and the seat frame side part has a recess;
the projection of the connection portion can be placed in engagement with the recess of the seat frame side part;
the connection portion has at least another projection to provide a multiplicity of projections;
the multiplicity of projections is arranged on the connection portion of the reinforcement profile;
the projections project forwardly in the longitudinal direction from the connection portion.

13. The vehicle seat as claimed in claim 12, wherein the connection portion is formed integrally with the reinforcement profile.

14. The vehicle seat as claimed in claim 13, wherein:
the reinforcement profile comprises a main body; and
the connection portion projects approximately perpendicularly from a rear end of the main body.

15. The vehicle seat as claimed in claim 14, wherein the longitudinal adjuster further comprises a screw-nut arrangement, wherein the reinforcement profile is fixed to the first seat rail by the screw-nut arrangement and a nut of the screw-nut arrangement guided in a guide rail arranged in the internal channel on the second seat rail.

16. The vehicle seat as claimed in claim 15, wherein the longitudinal adjuster further comprises a fixing element, wherein the reinforcement profile is held by the fixing element on said rearwardly directed surface of the seat frame side part.

* * * * *